UNITED STATES PATENT OFFICE.

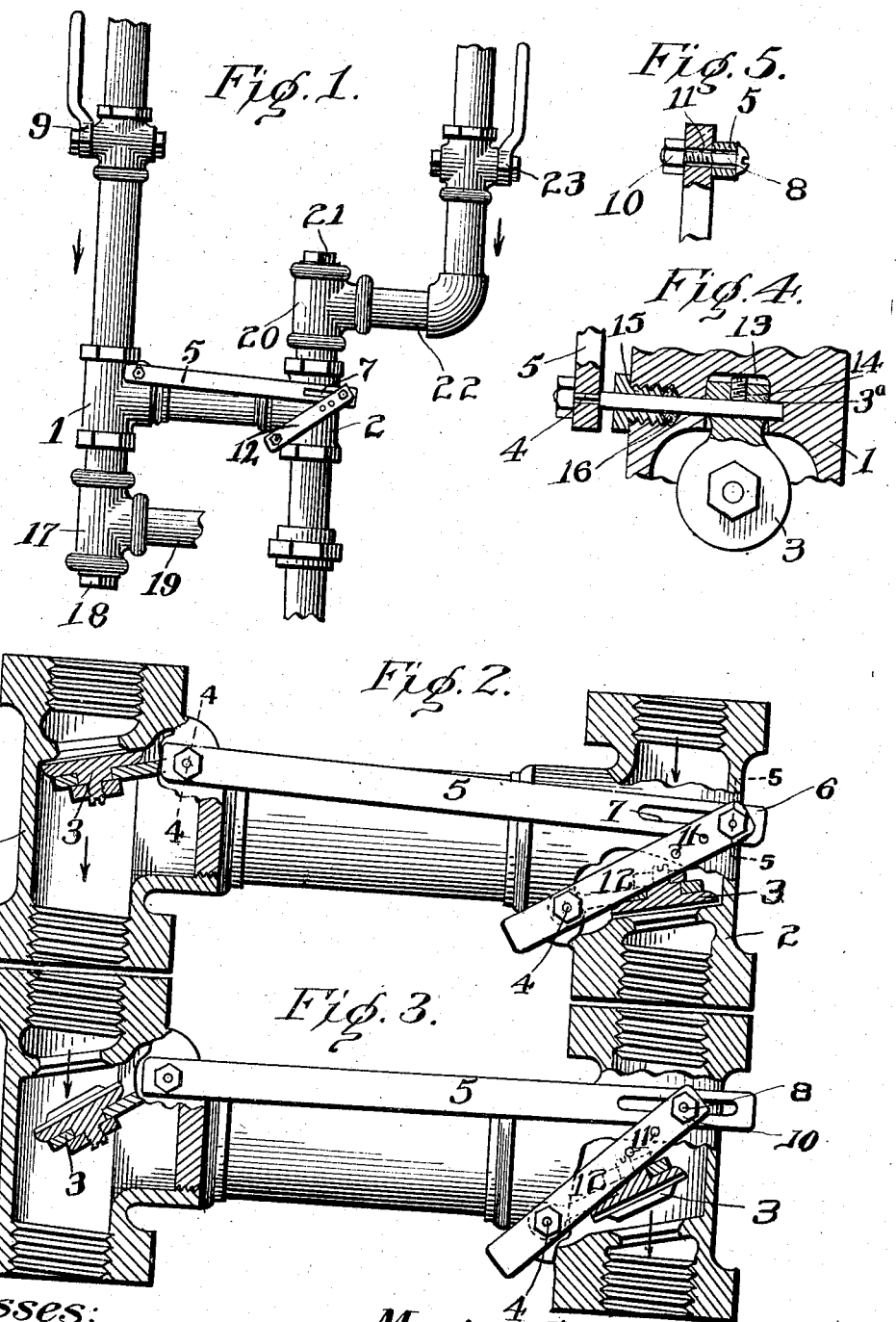

MANIOUS GARL, OF AKRON, OHIO, ASSIGNOR, BY MESNE ASSIGNMENTS, TO THE AKRON AUTOMATIC HOT WATER HEATER CO., OF AKRON, OHIO.

VALVE DEVICE.

No. 924,159.   Specification of Letters Patent.   Patented June 8, 1909.

Application filed June 25, 1908. Serial No. 440,344.

*To all whom it may concern:*

Be it known that I, MANIOUS GARL, a citizen of the United States, residing at Akron, in the county of Summit and State of Ohio, have invented certain new and useful Improvements in Valve Devices, of which the following is a specification, reference being had therein to the accompanying drawing.

This invention relates to improvements in valve devices, used in conjunction with a heater, and the primary object of the invention is the production of means for facilitating the synchronous actuation or operation of a plurality of valves, preferably, a valve for closing a water-inlet and a valve for closing a gas-inlet.

Another object of the invention is the construction of a valve device embodying two synchronously-actuated valves, which device comprises a minimum number of parts that are comparatively inexpensive to construct and efficient in operation.

With these and other objects in view, the invention consists of certain novel constructions, combinations, and arrangements of parts, as will be hereinafter fully described and claimed.

In the drawings: Figure 1 is a plan view of a device constructed in accordance with the present invention, and showing the same assembled with the inlet pipes of a heater or similar device. Fig. 2 is an enlarged view of the device, showing the valves and their casings, or the couplings carrying the same in section; the valves being in a closed or seated position, whereas in Fig. 3, the valves are shown in an open position. Fig. 4 is a sectional view taken on line 4, 4, Fig. 2. Fig. 5 is a sectional view taken on line 5, 5, Fig. 2.

Referring to the drawings by numerals, 1 designates the water or primary valve casing, and 2 the gas or auxiliary valve casing. Each of the valve casings constitutes a coupler, as they are internally threaded at their ends, whereby pipes or tubings can be threaded into the same for connecting said casings or couplers 1 and 2 with a heater or similar device. In each casing or coupler is mounted a similarly constructed valve 3, although the valves are arranged in opposite positions, that is to say, one faces in an opposite direction to the other, although each valve is fixedly secured to a stem having an outwardly squared end 4.

A primary connecting link or bar 5 is provided with a square opening or aperture, through which extend the squared end of the shaft, which is fixedly secured to the water valve 3, mounted in casing 1, whereby, upon swinging the slotted end 6 of the connecting primary-link upward, the valve in the casing 1 will be opened. The elongated slot 7 in the primary connecting link 5, is provided for permitting the bolt 8 to slide back and forth when the valve in casing 1 is opened and closed by reason of opening and closing the faucet 9. The bolt 8 is provided with a nut 10 upon its threaded end, whereby the bolt can be quickly placed in either one of the apertures 11 of the auxiliary link 12 for adjusting the connecting link and valves for retaining said valves in a perfect seated position, when closed, so that no leakage of the water or gas will be permitted between the valve seats and the valve. It is to be noted that by reason of the longitudinally-extending slots 7 of link 5, and the adjustable fastening means for connecting the primary link 5 and the auxiliary link 12, that I have provided means for adjustably securing the valves together, whereby upon the actuation of one valve for opening or closing the same, the other valve will be synchronously operated; the auxiliary link 12 is provided with a squared aperture, into which fits the squared or polygonal end of the stem, which stem extends into the valve casing, the same as the end of the primary link 5, which is mounted upon the stem or shaft supporting the valve in casing 1.

In Fig. 4, I have shown how the valves 3 are supported in their respective casings and, therefore, it will only be necessary to specifically describe one of these valves and its connection. The stem extends across, preferably, a socket or recess 13 formed in the valve casing or coupler, and into this extends the apertured extension $3^a$ of the valve; the stem extending through the aperture of the valve, and said stem and valve are secured against independent rotary movement through the medium of a set-screw 14. A packing gland 15, together with a suitable packing 16, forms a tight joint or connection, preventing any leakage.

When the faucet 9 is open, the water-valve will open or close the gas-valve. It is to be noted that the connecting means permits adjustment for a large or small flow of gas. Furthermore, when the water faucet at a sink begins to leak, by a slight adjustment of my peculiarly-constructed connecting means, to wit: the placing of bolt 8 in a different aperture 11, this leakage will not open the water valve and allow the water to be heated, resulting in the water being heated only when the faucet is opened by a person.

In Fig. 1, the valves are shown in their assembled operative position, and it is to be noted that beneath or at one side of casing 1, there is a tee-coupler 17, with a plug 18, and an outlet pipe 19, to the water coil, on the side, and also immediately above or to one side of the valve-casing 2, another tee-coupler 20, with a plug 21, is shown; the inlet pipe 22 for the gas is shown secured to the side of the coupler 21; the flow of gas being controlled by the valve, at 23. These two tees are employed for allowing an opening to permit the examination of the valve sides, or fixing the screw holding the valves, etc. By regulating the faucet, the operator will regulate the temperature of the water, as a small amount of water may be permitted to pass through the valve-casing 1, and by reason of this fact, only a small amount of gas will escape to the burner through the valve-casing 2. Therefore, it will be noted that I have provided a peculiarly-constructed valve-device, which controls the amount of liquid or water discharged into the heater, and the size of the flame to the burner; the greater the flow of liquid, the greater the flame of the burner has, and the smaller the flow of liquid, the smaller the discharge of gas to the burner.

What I claim is:

1. In a device of the character described, the combination with a pair of valves provided with stems, of a primary link fixedly secured near one end to one of the stems and provided near its opposite end with an elongated aperture, an auxiliary link fixedly secured to the stem of the other valve, and means positioned in the elongated aperture of the primary link and detachably secured to the auxiliary link and thereby slidably connecting the primary link to said auxiliary link whereby both valves will be synchronously operated.

2. In a device of the character described, the combination with a pair of valves, of a primary link fixedly secured to one valve, an auxiliary link fixedly secured to the other valve, said primary link provided with an elongated aperture or opening, said auxiliary link provided with a plurality of apertures, and detachable fastening means positioned in one of the apertures of the auxiliary link and slidably mounted in the elongated aperture of the primary link.

3. A device of the character described, comprising a pair of casings, valves movably mounted in said casings, one valve provided with an extension or link having an elongated aperture therein, the other valve provided with an extension, positioned contiguous to the apertured portion of the other extension, and means slidably connecting and positioned in the aperture of the extension, whereby when one valve is moved, the other valve will be synchronously moved in the opposite direction.

In testimony whereof I hereunto affix my signature in the presence of two witnesses.

MANIOUS GARL.

Witnesses:
CHARLES MOTZ,
WM. WOLF.